(12) United States Patent  (10) Patent No.: US 8,162,394 B2
Yasuda et al.  (45) Date of Patent: Apr. 24, 2012

(54) VEHICLE SEAT

(75) Inventors: Masanari Yasuda, Tochigi (JP); Kenichi Nitsuma, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 74 days.

(21) Appl. No.: 12/743,392

(22) PCT Filed: Nov. 20, 2008

(86) PCT No.: PCT/JP2008/071117
§ 371 (c)(1),
(2), (4) Date: May 18, 2010

(87) PCT Pub. No.: WO2009/066729
PCT Pub. Date: May 28, 2009

(65) Prior Publication Data
US 2010/0264704 A1  Oct. 21, 2010

(30) Foreign Application Priority Data
Nov. 21, 2007  (JP) ................................. 2007-301889

(51) Int. Cl.
*B60N 2/42* (2006.01)
*B60R 21/00* (2006.01)
(52) U.S. Cl. ................................................. 297/216.12
(58) Field of Classification Search ............. 297/216.12, 297/216.13, 216.14
See application file for complete search history.

(56) References Cited

U.S. PATENT DOCUMENTS

| 6,179,379 | B1 * | 1/2001 | Andersson | 297/216.13 |
|---|---|---|---|---|
| 6,523,892 | B1 * | 2/2003 | Kage et al. | 297/216.13 |
| 7,077,472 | B2 * | 7/2006 | Steffens, Jr. | 297/216.13 |
| 7,097,242 | B2 * | 8/2006 | Farquhar et al. | 297/216.12 |
| 7,104,602 | B2 * | 9/2006 | Humer et al. | 297/216.12 |
| 7,530,633 | B2 * | 5/2009 | Yokota et al. | 297/216.12 |
| 7,731,280 | B2 * | 6/2010 | Niitsuma et al. | 297/216.12 |
| 2011/0210588 | A1 * | 9/2011 | Omori et al. | 297/216.12 |

FOREIGN PATENT DOCUMENTS

| JP | 09-136611 A | 5/1997 |
|---|---|---|
| JP | 2001-001820 A | 1/2001 |
| JP | 2006-122297 A | 5/2006 |
| JP | 2006-182094 A | 7/2006 |
| JP | 2007-062523 A | 3/2007 |
| JP | 2007-290466 A | 11/2007 |
| JP | 2008-184091 A | 8/2008 |

* cited by examiner

*Primary Examiner* — Milton Nelson, Jr.
(74) *Attorney, Agent, or Firm* — Drinker Biddle & Reath LLP

(57) ABSTRACT

There is provided a vehicle seat that includes a seat back frame having a pair of side frames disposed in a spaced manner in the right and left direction, a plate-like support body disposed between the pair of side frames to receive a load placed by the rearward movement of a passenger, a transmission section disposed on one side frame side to connect the plate-like support body to the headrest and transmit the load received by the plate-like support body to the headrest side, and an engagement section disposed on the other side frame side, engaging the plate-like support body with the other side frame, and not connected to the headrest. The load received by the plate-like support body is transmitted to the headrest side via the transmission section, thereby moving the headrest.

6 Claims, 13 Drawing Sheets

VEHICLE SEAT

CROSS-REFERENCE TO RELATED APPLICATIONS

This application is the U.S. national phase of the International Patent Application No. PCT/JP2008/071117 filed Nov. 20, 2008, which claims the benefit of Japanese Patent Application No. 2007-301889 filed Nov. 21, 2007, the entire content of which is incorporated herein by reference.

BACKGROUND

The present invention relates to a vehicle seat and, more particularly, to a vehicle seat having a mechanism for moving a headrest in a rear-end collision.

When a collision of a vehicle, such as an automobile, occurs from the rear (a so-called rear-end collision), the head of a seated passenger is moved suddenly to the rear by inertia, and the neck may be shocked. Therefore, there has conventionally been known a vehicle seat provided with a configuration for buffering a shock by moving the headrest to the front and supporting the passenger's head at the time of the occurrence of rear-end collision to protect the head, the neck, and the like of the passenger from the shock in a rear-end collision (see, e.g., Japanese Unexamined Patent Application Publication No. 2006-182094 ("the '094 Application")).

The vehicle seat described in the '094 Application has a configuration in which a plate body is mounted to a seat back frame of a seat back to be movable back and forth, a headrest is mounted in the upper part of the seat back frame to be movable by an upper link, a lower link connected to the plate body is rotatably provided in the lower part of the seat back frame, and the lower link and the upper link are connected to each other by a transmission member, and is configured so that a load sensed by the plate body at the time of rear-end collision is transmitted to the upper link to move the headrest to the front.

For this vehicle seat, the load at the time when the passenger is moved to the rear by rear-end collision is received by a portion near the waist having a rearward displacement larger than that of the back, whereby the rear-end collision can be sensed with certainty. Also, by the configuration in which the load received by the plate body is transmitted to the upper link via the transmission member, the load can be transmitted to the upper link with high transmission efficiency, so that the operation for moving the headrest to the front becomes reliable.

FIG. 12 is a perspective view of a seat back frame 100 for the above-described conventional vehicle seat, and FIG. 13 is a sectional view taken along the line Z-Z of FIG. 12, showing a portion in which an airbag module 110 for a side airbag is mounted to a side frame 101 of the seat back frame 100. In the vehicle seat described in the '094 Application, a transmission member 107 connecting an upper link 105 to a lower link 106 is mounted to cover a part of the inside of the side frame 101 of the seat back frame 100. Therefore, when a member such as the airbag module 110 or an armrest is attached to the outside of the side frame 101, the attachment from the inside of the side frame 101 has been difficult to attach.

Specifically, as shown in FIG. 13, the airbag module 110 is attached to the side frame 101 via fasteners 103 such as bolts and nuts. Reference numeral 112 denotes an inflator in the airbag module 110. Since the transmission member 107 connecting the upper link 105 to the lower link 106 is located at a position overlapping with the position of a mounting hole 102 formed in the side frame 101 to allow the fastener 103 to pass through, a tool for attaching the airbag module 110 or the like is difficult to access because of hindrance placed by the transmission member 107, and therefore the attaching work is difficult to do.

Also, in the conventional vehicle seat having a configuration in which the headrest is moved to the front at that time of the occurrence of rear-end collision to support the passenger's head, the number of parts for forming the configuration is large. Therefore, it is desired to decrease the number of parts and to reduce the weight of seat.

SUMMARY

An object of various embodiments of the present invention is to provide a vehicle seat in which the degree of freedom of layout of ancillary parts such as an airbag module can be increased, and the attaching work for the ancillary parts is performed easily while a configuration is kept in which, at the time of the occurrence of rear-end collision of vehicle, a headrest is moved to the front to support the passenger's head and to buffer a shock. Another object is to provide a vehicle seat in which the number of parts is decreased, and the weight is reduced while a configuration is kept in which at the time of the occurrence of rear-end collision of vehicle, a headrest is moved to the front to support the passenger's head and to buffer a shock. Still another object is to provide a vehicle seat that reduces a rearward load applied to the passenger's head when a rear-end collision occurs.

To achieve the above objects, the vehicle seat is provided having a mechanism for moving a headrest in a rear-end collision and comprises: a seat back frame having a pair of side frames disposed in a spaced manner in a right and left direction; a pressure receiving part disposed between the pair of side frames to receive a load placed by a rearward movement of a passenger; a transmission section disposed on one side frame side of the pair of side frames to connect the pressure receiving part to the headrest and transmit the load received by the pressure receiving part to the headrest side; and an engagement section disposed on the other side frame side of the pair of side frames that engages the pressure receiving part with the other side frame, and is not connected to the headrest, wherein when a load exceeding a predetermined magnitude is received by the pressure receiving part, the load is transmitted to the headrest side via the transmission section, thereby moving the headrest.

Thus, the transmission section is provided on one side frame side of the pair of side frames forming the seat back frame, and the engagement section not connected to the headrest is provided on the other side frame side. Therefore, the transmission section is not disposed on the inside of the side frame on the side on which the engagement section is provided, so that the degree of freedom of layout of ancillary parts is increased. Also, the work for attaching the ancillary parts to the side frame can be performed easily.

Furthermore, as compared with the conventional vehicle seat provided with the transmission section on both side frame sides, the number of members of the transmission section used in one seat assembly can be reduced. Therefore, the number of parts can be decreased, and the manufacturing cost can be reduced. Also, the weight of seat can be reduced.

Also, by providing the transmission section on one side frame side only, when a rear-end collision occurs and the passenger's back and waist press the pressure receiving part, the side on which the transmission section is provided of the pressure receiving part moves greatly to the rear, and the pressure receiving part tilts slantwise with respect to the right and left direction. As a result, the passenger's posture tilts slantwise, and an impact force is distributed to the transverse direction. Therefore, as compared with the vehicle seat provided with the transmission section on both sides, a rearward load, that is, the impact force applied to the passenger's trunk and head can be reduced.

At this time, it is preferable that the transmission section include a lower link rotatably mounted in the lower part of the one side frame and connected to the pressure receiving part; an upper link connected to the headrest; and a connecting link connecting the lower link and the upper link to each other and operating in association with the rotating of the lower link.

By this configuration of the transmission section, the loss of load can be suppressed, the load received by the pressure receiving part can be transmitted to the headrest efficiently via the links, and the headrest can be moved.

Also, it is preferable that the engagement section include a movable member mounted to the other side frame and connected to the pressure receiving part; and an urging member for urging the movable member to the direction opposite to the load received by the pressure receiving part.

If the engagement section includes the movable member and the urging member as described above, due to the load received by the pressure receiving part, not only the transmission section but also the movable member of the engagement section can move, so that the load can be distributed to the right and left direction of vehicle seat in good balance. Also, by adjusting the urging force of the urging member, the load applied to each of the engagement section and the transmission section can be adjusted, and the magnitude of the slantwise tilt at the time when the pressure receiving part moves to the rear can be adjusted.

Further, the configuration can be made such that the pressure receiving part is engaged with the other side frame via a connecting member; the engagement section is formed integrally with the other side frame; and the connecting member is locked to the engagement section.

By locking the connecting member to the engagement section formed integrally with the other side frame as described above, the number of parts of the engagement section can be reduced significantly. Therefore, the manufacturing cost can be decreased, and the weight of the seat can be reduced. Also, since the connecting member is directly locked to the engagement section formed integrally with the other side frame, the load concentrates further on the transmission section side, the slantwise rearward displacement on the side on which the transmission section is provided of the pressure receiving part increases, and the tilt of the passenger's posture increases. Therefore, the load is distributed, and the rearward load, that is, the impact force applied to the passenger's trunk and head can be reduced.

Also, the configuration can be made such that the other side frame provided with the engagement section is formed to be shorter in a headrest direction than the one side frame provided with the transmission section. By this configuration, the weight of entire seat can be further reduced.

Also, it is preferable that the lower link include a holding member disposed at a position separated from a rotating shaft by a predetermined distance; and the holding member connect the lower link to the one side frame, and keep the distance between the one side frame and the lower link at a predetermined value.

If the lower link is connected to the one side frame by the holding member, and the distance between the one side frame and the lower link is kept at the predetermined value, the lower link rotates when a load is received by the pressure receiving part, and when the transmission section side of the headrest operates, the lower link rotates while keeping the state of being in parallel with the side frame. Therefore, the transmission section can be prevented from tilting to the inside or the outside of seat and falling slantwise. As a result, the loss of the load for moving the headrest to the front can be suppressed, so that the load can be transmitted to the headrest efficiently.

According to the vehicle seat in accordance with various embodiments of the present invention, the degree of freedom of layout of ancillary parts of the seat back can be increased, and also the ancillary parts can be mounted and dismounted easily without impairing the function of moving the headrest to the front in a rear-end collision to hold and protect the passenger's head. Also, the number of parts of seat can be decreased, and the weight thereof can be reduced. Further, the impact force received by the passenger's head in a rear-end collision can be reduced.

BRIEF DESCRIPTION OF DRAWINGS

Various embodiments of the invention are described below with reference to the following drawing figures and associated descriptive text.

DETAILED DESCRIPTION OF THE EMBODIMENTS

One embodiment of the present invention will now be described with reference to the accompanying drawings. The members, arrangements, and the like described below do not restrict the present invention, and various changes and modifications can be made within the scope of teachings of the present invention.

Figure 1:
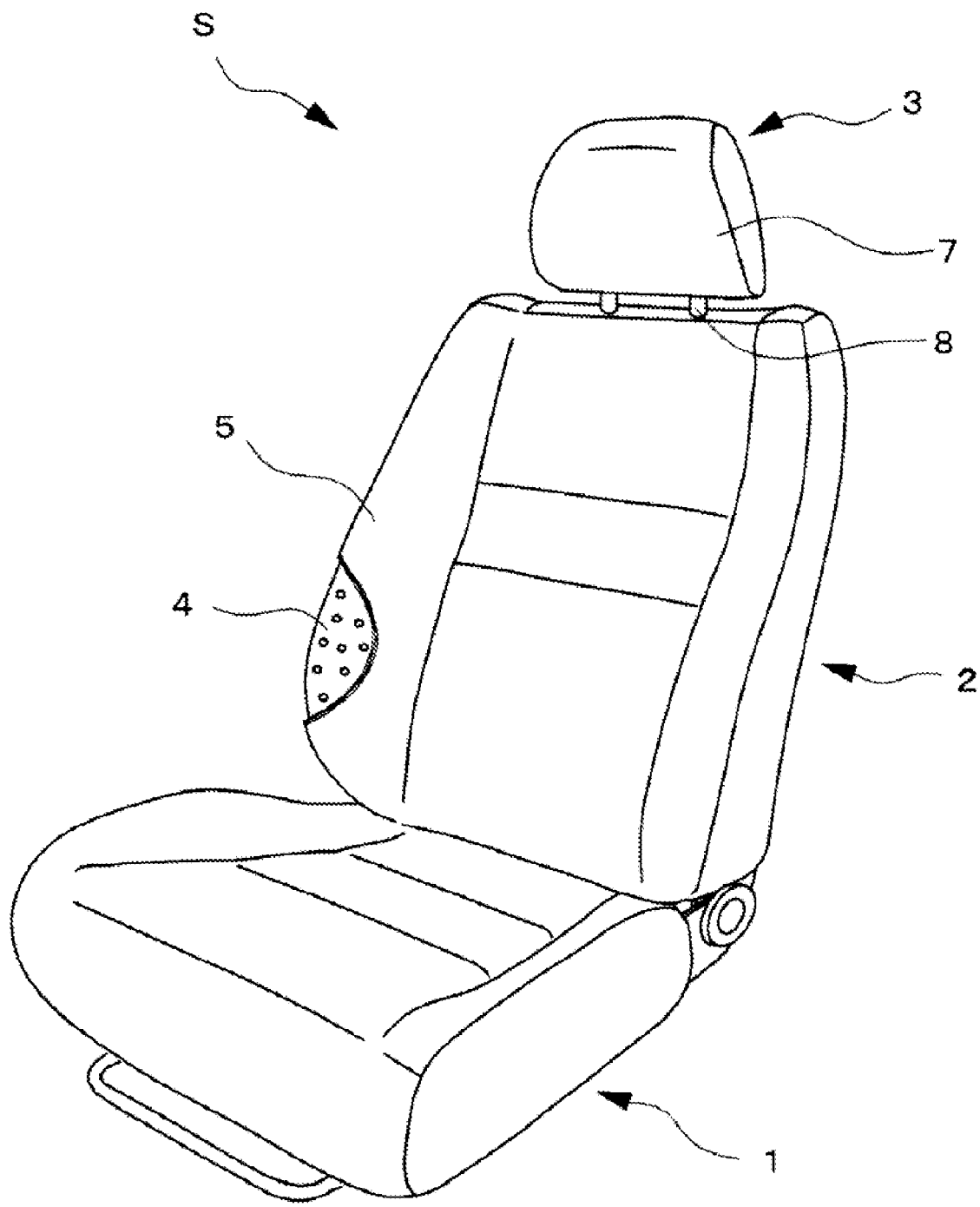
FIG. 1 is a perspective view of a vehicle seat in accordance with a first embodiment.

FIGS. 1 to 7 relate to one embodiment (a first embodiment) of the present invention. As shown in FIG. 1, a vehicle seat S of this embodiment (the first embodiment) includes a seat cushion 1, a seat back 2, and a headrest 3 mounted above the seat back 2. The seat cushion 1 and the seat back 2 of this embodiment are configured so that a cushion material 4 is attached to a seat cushion frame 10 and a seat back frame 20 (refer to FIG. 2), respectively, and the outer periphery of the cushion material 4 is covered with a cover material 5. The configuration of the headrest 3 is optional, and the headrest 3 is configured by including at least a head supporting part 7 for supporting the passenger's head and pillars 8 for mounting the head supporting part 7 to the seat back 2.

Figure 2:
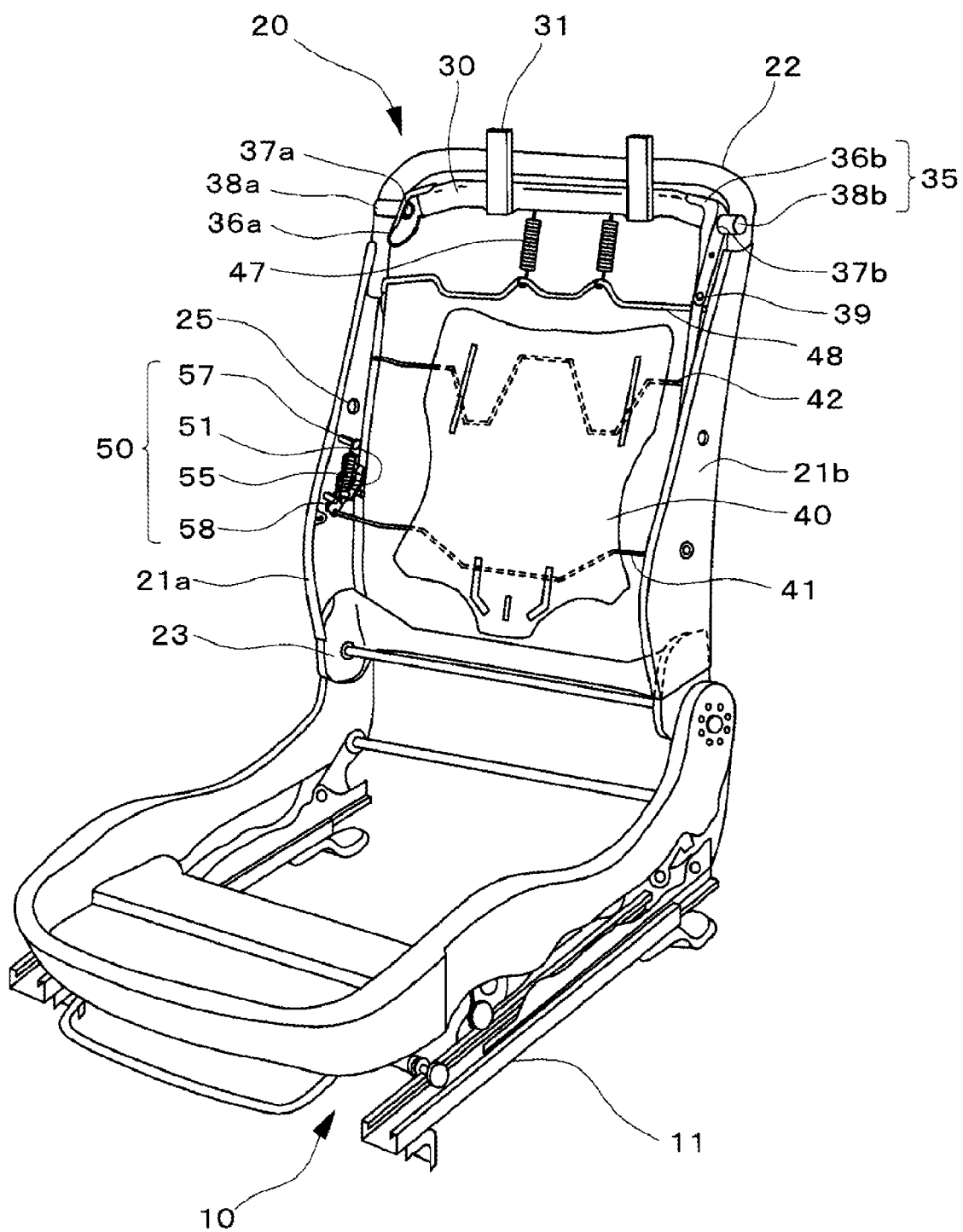
FIG. 2 is a schematic perspective view of a seat frame for a vehicle seat in accordance with a first embodiment.
Figure 3:
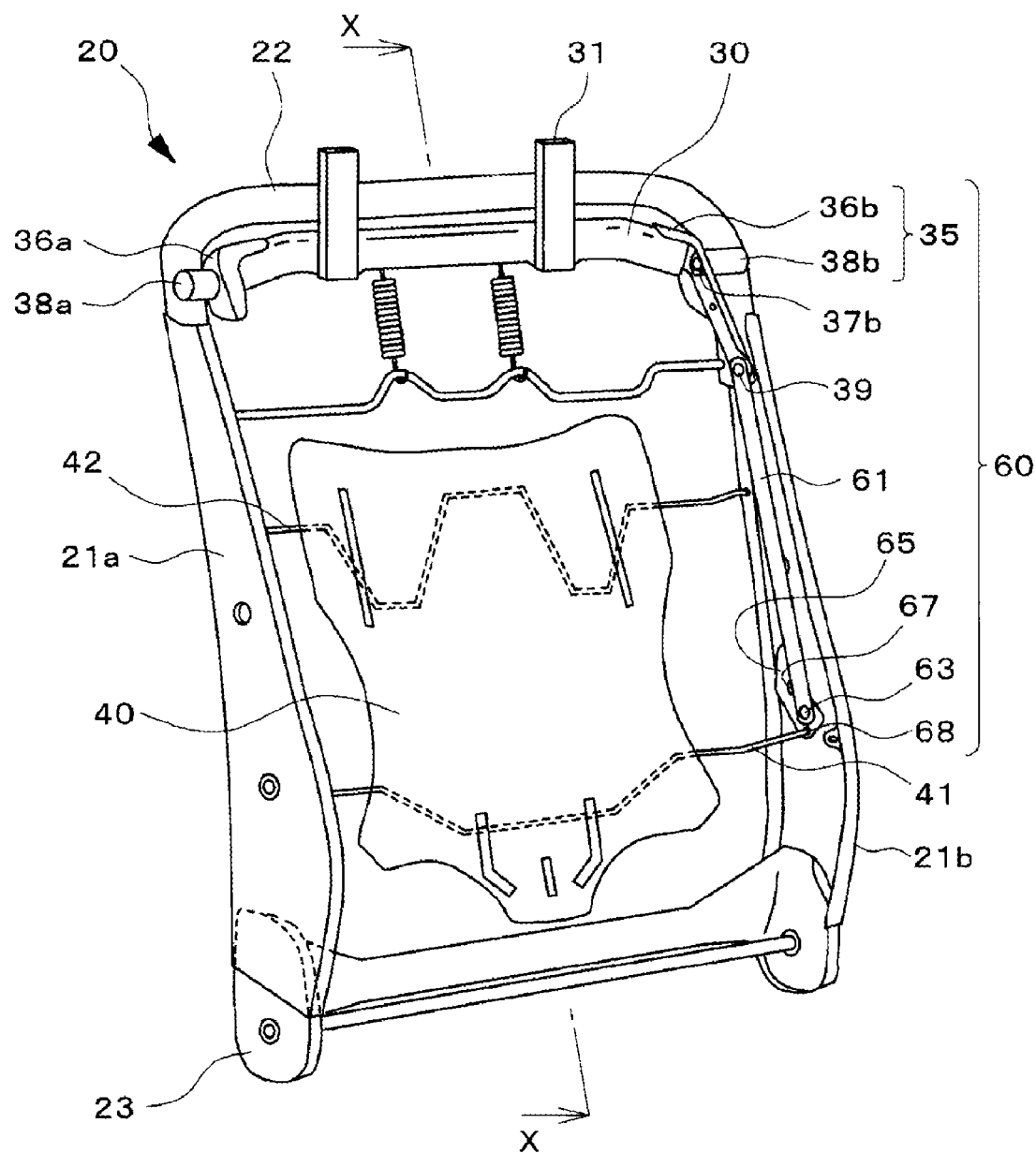
FIG. 3 is a schematic perspective view of a seat back frame for a vehicle seat in accordance with a first embodiment.

As shown in FIGS. 2 and 3, the frame and internal mechanism of the vehicle seat S of this embodiment include, as principal elements, frames such as the seat cushion frame 10, the seat back frame 20, and a headrest mounting rod 30, a plate-like support body 40 serving as a pressure receiving part that is disposed in a substantially central portion of the seat back frame 20, an engagement section 50 for connecting the plate-like support body 40 to the seat back frame 20, a transmission section 60 for connecting the plate-like support body 40 to the headrest 3, and the like.

As shown in FIG. 2, the frame of the vehicle seat S of this embodiment is configured by the seat cushion frame 10 constituting the seat cushion 1, the seat back frame 20 constituting the seat back 2, a base frame 11 connecting the vehicle seat S to a vehicle body floor (not shown), and the like. The seat back frame 20 has a pair of side frames 21*a* and 21*b* disposed in a spaced manner in the right and left direction and each having a predetermined length, an upper frame 22 connecting the upper end parts of the side frames 21*a* and 21*b* to each other, and a lower frame 23 connecting the lower end parts of the side frames 21*a* and 21*b* to each other.

Near the upper frame 22 on the inside of the seat back frame 20, a headrest mounting rod 30 extending in the right and left direction to hold the headrest 3 is disposed. The pillars 8 for the headrest 3 are inserted through and installed in two pillar supporting members 31 provided on the headrest mounting rod 30 so that the headrest height can be adjusted. The configurations of the pillar 8 and the pillar supporting member 31 are publicly known: an engagement member provided on the pillar supporting member 31 is engaged with a not-illustrated engagement concave part formed in the pillar 8, thereby holding the headrest 3.

To both ends of the headrest mounting rod 30, one end of a link bracket 36*a*, 36*b* comprising of a plate-like member having a substantially L-shaped cross section is fixed by welding or the like. The link bracket 36*a*, 36*b* is rotatably connected to one end of a rotation supporting member 38*a*, 38*b* via a shaft 37*a*, 37*b* on the seat back frame 20 side. The rotation supporting member 38*a*, 38*b* of this embodiment is welded to a portion near the connecting part of the upper frame 22 with the side frame 21.

In this embodiment, for the link bracket 36*a* disposed on the right-hand side as viewed from the passenger (the left-hand side in FIG. 2) of the seat back frame 20, the end part thereof on the opposite side to the end part connected to the headrest mounting rod 30 is a free end. Conversely, the end part of the link bracket 36*b* disposed on the left-hand side as viewed from the passenger (the right-hand side in FIG. 2) is connected to a connecting link 61, described below, via a shaft 39. The link bracket 36*b* connected to the connecting link 61 and the rotation supporting member 38*b* connected to the link bracket 36*b* constitute an upper link 35 in this embodiment.

Thus, the headrest mounting rod 30 is rotatably mounted to the seat back frame 20 via the link brackets 36*a* and 36*b* and the rotation supporting members 38*a* and 38*b* by the shafts 37*a* and 37*b*. That is, in the state in which the headrest 3 is mounted to the headrest mounting rod 30, the headrest 3 rotates with respect to the seat back frame 20 by the shafts 37*a* and 37*b*.

In the substantially central portion of the seat back frame 20, the plate-like support body 40 serving as a pressure receiving part is disposed. This plate-like support body 40 is a plate-like member for supporting the passenger's back, and has a function of stabilizing the sitting posture by supporting the passenger's back by way of the surface thereof when the passenger normally sits on the seat, and operating a link mechanism comprising the transmission section 60, described below, by being pressed and moved rearward by the rearward movement of the passenger when the vehicle is impacted from the rear.

The plate-like support body 40 is mounted to the right and left side frames 21*a* and 21*b* via two wire springs 41 and 42 disposed in parallel with each other in the up and down direction to be movable back and forth. The wire spring 42 disposed above is mounted in wire locking holes (not shown) of the side frames 21*a* and 21*b*, and the wire spring 41 disposed below is configured so that one end thereof is locked to a wire locking hole 53 in a link member 51 of the engagement section 50, described below, and the other end thereof is locked to a wire locking hole 68 in a lower link 65 of the transmission section 60, described below, so that the wire spring 41 is mounted to the side frames 21*a* and 21*b* via the link members. This wire spring 41 disposed below is a connecting member that connects the plate-like support body 40 to the engagement section 50 and the transmission section 60 and further connects the plate-like support body 40 to the side frames 21*a* and 21*b* via the engagement section 50 and the transmission section 60.

The plate-like support body 40 of this embodiment is formed of a synthetic resin such as polypropylene to have a strength to support the passenger, and supports the passenger while being elastically deformed to some extent when receiving a rearward load from the passenger. Also, the wire spring 41, 42 has predetermined elasticity, and extends to some extent to move the plate-like support body 40 to the rear when a load is applied to the plate-like support body 40. As the wire spring 41, 42, a zigzag spring, a formed wire spring, or the like, can be used.

Above the plate-like support body 40, a spring support wire 48 extending in the right and left direction is disposed so that both ends thereof are fixed to the side frames 21*a* and 21*b*, and two return springs 47 are disposed in a spaced manner in parallel with each other between the headrest mounting rod 30 and the spring support wire 48. Except at the time of a rear-end collision of vehicle, the return springs 47 urge the headrest mounting rod 30 to the rear to erect the headrest 3.

Figure 4:
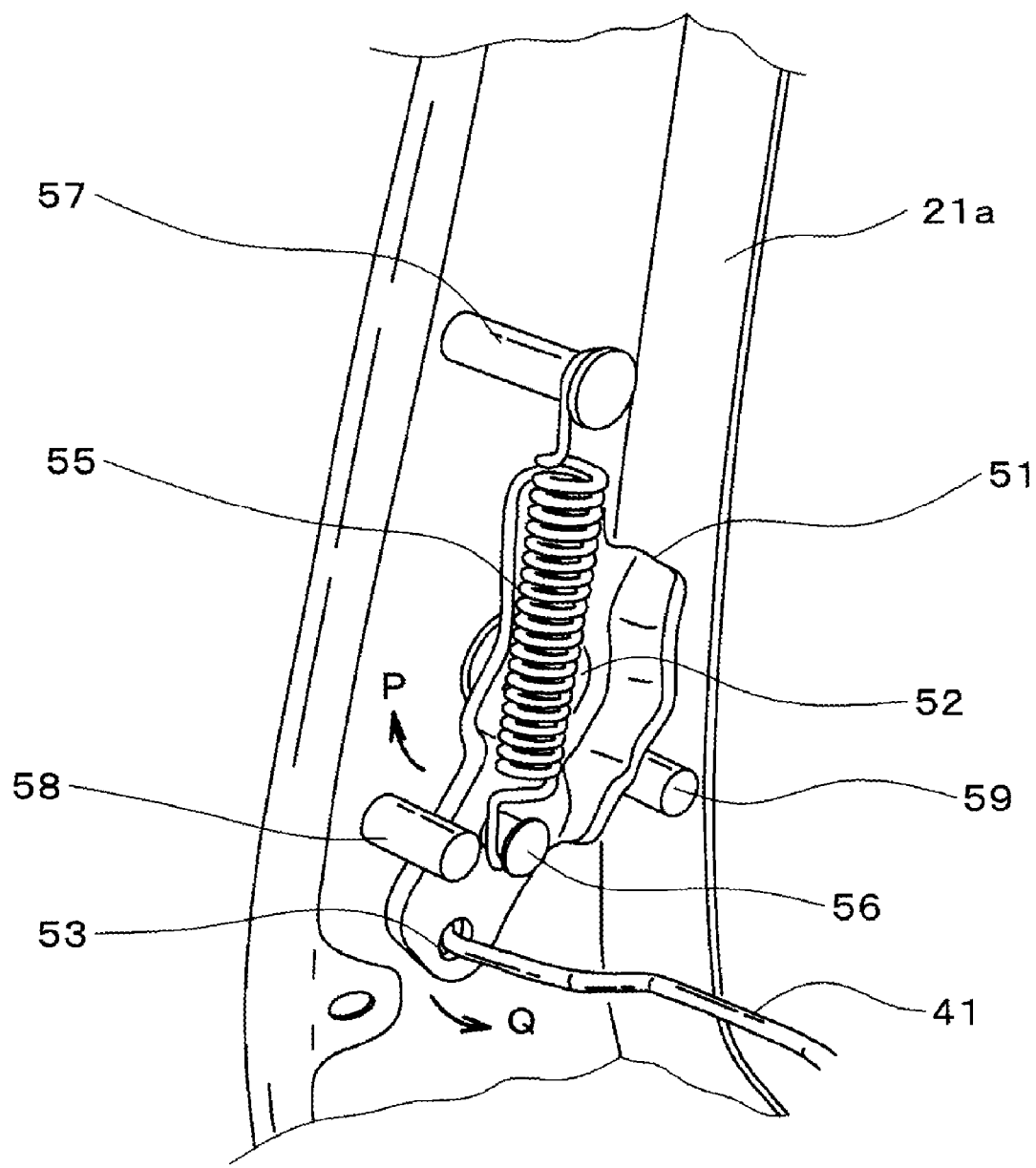
FIG. 4 is an explanatory perspective view of an engagement section for a vehicle seat in accordance with a first embodiment.

The vehicle seat S of this embodiment is provided with the engagement section 50, which is connected to the plate-like support body 40 via the wire spring 41, on the inside of the side frame 21*a* on the right-hand side as viewed from the passenger (the left-hand side in FIG. 2) of the seat back frame 20. When a load is applied to the plate-like support body 40, the load is transmitted to this engagement section 50 via the wire spring 41. The configuration thereof is shown in FIG. 4.

The engagement section 50 of this embodiment includes the link member 51 serving as a movable member, an extension spring 55 serving as an urging member, a first spring locking pin 56 and a second spring locking pin 57 for locking both ends of the extension spring 55, and a first stopper 58 and a second stopper 59 for regulating the rotation of the link member 51.

The link member 51 serving as the movable member, which is a member having a shape formed by bending and erecting the side edge portion of a substantially L-shaped plate body to the perpendicular direction, is pivotally supported on the inside surface of the side frame 21*a* via a shaft 52 located substantially in the center of the link member 51. On the lower end part side of the link member 51, the wire locking hole 53 is formed, and one end of the wire spring 41 is locked to the wire locking hole 53. Also, between the shaft 52 of the link member 51 and the wire locking hole 53, the cylindrical first spring locking pin 56 for locking the lower end part of the extension spring 55 is formed.

Above the link member 51 of the side frame 21a, the cylindrical second spring locking pin 57 for locking the upper end part of the extension spring 55 is formed.

The extension spring 55 serving as the urging member is an extension spring formed by coiling a spring wire rod, and a semicircular hook is formed in both end parts of the extension spring 55, so that the extension spring 55 is mounted by hooking the lower end part thereof to the first spring locking pin 56 and hooking the upper end part thereof to the second spring locking pin 57. In the normal state in which no load is applied to the plate-like support body 40, the extension spring 55 urges the link member 51 to the seat front slantwise upward direction (the direction indicated by the arrow mark P in FIG. 4).

On the inside of the side frame 21a, two cylindrical members, the first stopper 58 and the second stopper 59, are provided at the right and left of the link member 51 to project perpendicularly from the inside surface of the side frame 21a to hold the link member 51 therebetween. The first stopper 58 and the second stopper 59 are stopper members for regulating the movement allowable range of the link member 51. In the normal state in which no load is applied to the plate-like support body 40, the link member 51 is urged in the front slantwise upward direction by the extension spring 55, and the front on the lower end side of the link member 51 comes into contact with the first stopper 58 so that the rotating of the link member 51 is inhibited.

When a load is applied to the plate-like support body 40 and the plate-like support body 40 is pressed and moved to the member on account of the occurrence of a rear-end collision of the vehicle, the link member 51 is pulled to the rear by the wire spring 41 connected to the plate-like support body 40, and rotates rearward (to the direction indicated by the arrow mark Q in FIG. 4) around the shaft 52. When the link member 51 rotates rearward, and the rear on the lower end side of the link member 51 comes into contact with the second stopper 59, further rotation is inhibited.

Even in the state in which the passenger sits on the seat in the normal driving state and leans against the seat back, a load of some degree is applied to the plate-like support body 40; however, the extension spring 55 has load characteristics such that the link member 51 does not rotate, that is, the extension spring 55 does not deflect under the load applied in the normal driving state. Therefore, in the normal driving state, the state in which the link member 51 is urged by the extension spring 55 and is in contact with the first stopper 58 is maintained.

Figure 5:
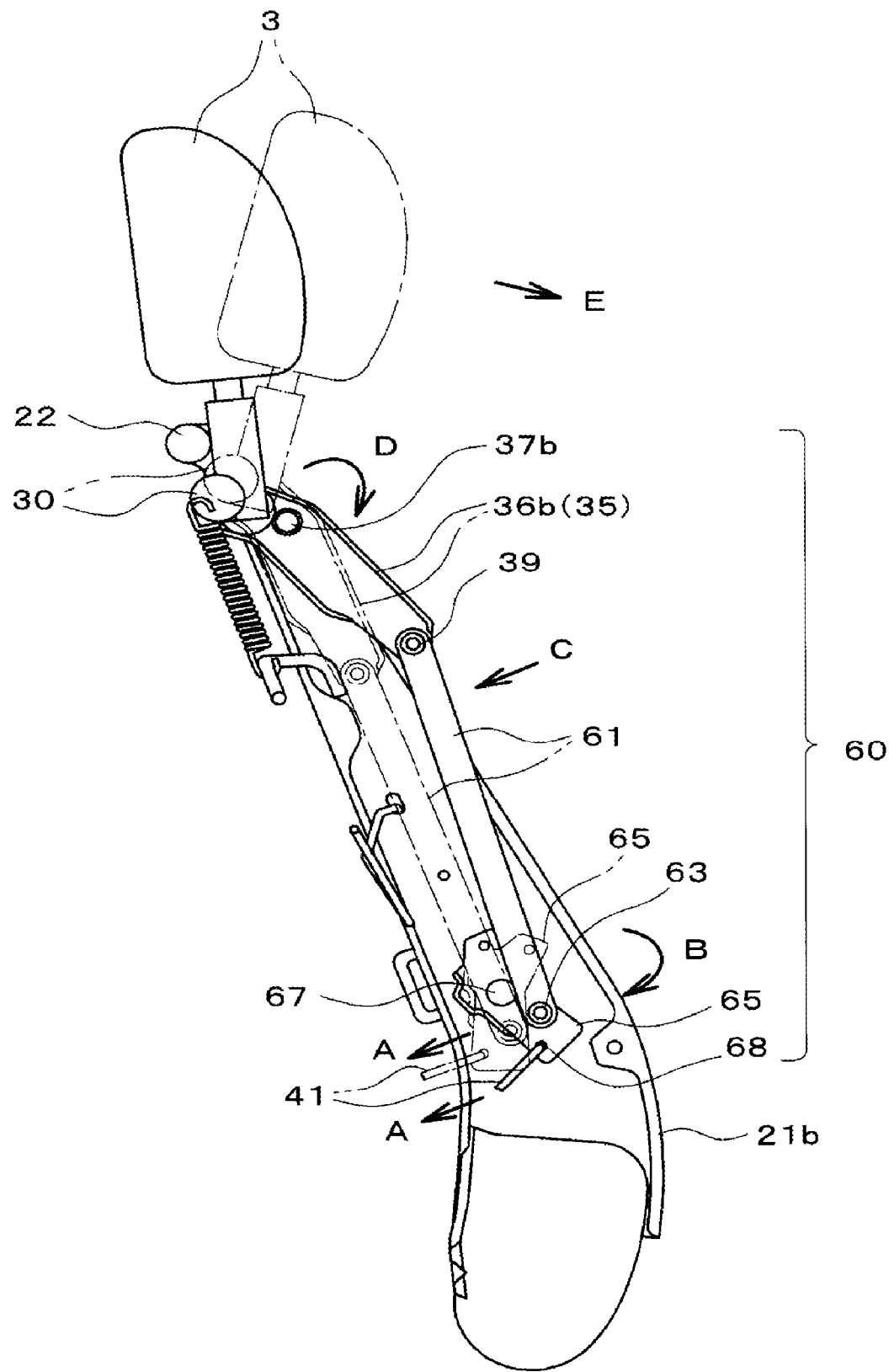
FIG. 5 is an operation explanatory side view of a transmission section for a vehicle seat in accordance with a first embodiment.

As shown in FIGS. 3 and 5, the vehicle seat S of this embodiment is provided with the transmission section 60, which is connected to the plate-like support body 40 via the wire spring 41, on the inside of the side frame 21b on the left-hand side as viewed from the passenger (the right-hand side in FIG. 3) of the seat back frame 20. When a rearward load is applied to the plate-like support body 40, the load is transmitted to the transmission section 60 via the wire spring 41, and is further transmitted to the headrest 3 side via the transmission section 60. The vehicle seat S of this embodiment has an active headrest mechanism such that when the vehicle receives a shock from the rear and the passenger moves to the rear, the headrest 3 moves to the front with respect to the seat back 2 to positively support the passenger's head. The frontward movement of the headrest 3 due to the active headrest mechanism is realized by the transmission of the load received by the plate-like support body 40 to the headrest 3 side via the transmission section 60. FIG. 5 is a sectional view taken along the line X-X of FIG. 3, showing the seat back frame 20 and members disposed on the inside thereof shown in FIG. 3.

The transmission section 60 of this embodiment forms the link mechanism formed by principal elements of the upper link 35, the lower link 65, and the connecting link 61 connecting the upper link 35 to the lower link 65. The upper link 35 is formed by the link bracket 36b and the rotation supporting member 38b as described above. As shown in FIGS. 3 and 5, the link bracket 36b extends downward from the connecting part with the headrest mounting rod 30, and to the end part on the opposite side to the headrest mounting rod 30, the upper end part of the connecting link 61 is fixed via the shaft 39.

The connecting link 61, which is a plate-like member extending in the up and down direction, is provided to hang down from the lower end part of the link bracket 36b. The lower end part of the connecting link 61 is rotatably connected to the corner part of the front on the lower side of the lower link 65 via a shaft 63. Thus, the connecting link 61 connects the lower link 65 and the upper link 35 to each other.

The lower link 65, which is a substantially L-shaped plate-like member, is rotatably fixed to the inside surface of the side frame 21b via a shaft 67. Also, the wire locking hole 68 is formed below the shaft 63 of the lower link 65. One end of the wire spring 41 is inserted through the wire locking hole 68, and the end part of the wire spring 41 is bent, whereby the wire spring 41 is locked to the wire locking hole 68.

The operation of the transmission section 60 and the headrest 3 at the time of occurrence of rear-end collision of vehicle is explained with reference to FIG. 5. When the vehicle is impacted from the rear and a load not smaller than a predetermined magnitude is applied to the plate-like support body 40, the plate-like support body 40 and the wire spring 41 move rearward, that is, in the direction indicated by the arrow mark A in FIG. 5. When the wire spring 41 moves rearward, the lower part of the lower link 65 is pulled by the wire spring 41, and rotates to the direction indicated by the arrow mark B in FIG. 5 around the shaft 67.

When the lower link 65 rotates to the direction indicated by the arrow mark B, the shaft 63 connecting the lower link 65 and the connecting link 61 to each other moves rearward, and the connecting link 61 moves rearward, that is, in the direction indicated by the arrow mark C in FIG. 5. Then, the lower side of the link bracket 36b connected to the upper side of the connecting link 61 moves rearward, that is, in the direction indicated by the arrow mark C in FIG. 5, and the link bracket 36b rotates to the direction indicated by the arrow mark D in FIG. 5 around the shaft 37b. Thereby, the headrest mounting rod 30 connected to the link bracket 36b moves frontward, so that the headrest 3 moves in the direction indicated by the arrow mark E in FIG. 5, that is, frontward (the broken line in FIG. 5). Thus, when a rear-end collision of vehicle occurs, the transmission section 60 (the link mechanism) is operated by the load received by the plate-like support body 40, and the headrest 3 moves to the front to support the passenger's head.

As described above, the vehicle seat S of this embodiment is provided with the engagement section 50 not connected to the headrest 3 on the inside of one side frame 21a, and is provided with the transmission section 60 including the connecting link 61 connected to the headrest 3 on the inside of the other side frame 21b. As shown in FIG. 2, since the side frame 21a on the side on which the engagement section 50 is provided does not have the connecting link 61, a mounting hole 25 for attaching a member such as an airbag module or an armrest is not covered by another member such as the connecting link 61. Therefore, the work for attaching the member such as an airbag module or an armrest can be performed easily.

The operations of the engagement section 50 and the transmission section 60 at the time when a rear-end collision occurs and a load is applied to the plate-like support body 40 are as described above. Next, the operation of the vehicle seat S and the state of the passenger at the time of occurrence of rear-end collision are explained with reference to FIGS. 6 and 7.

Figure 6:
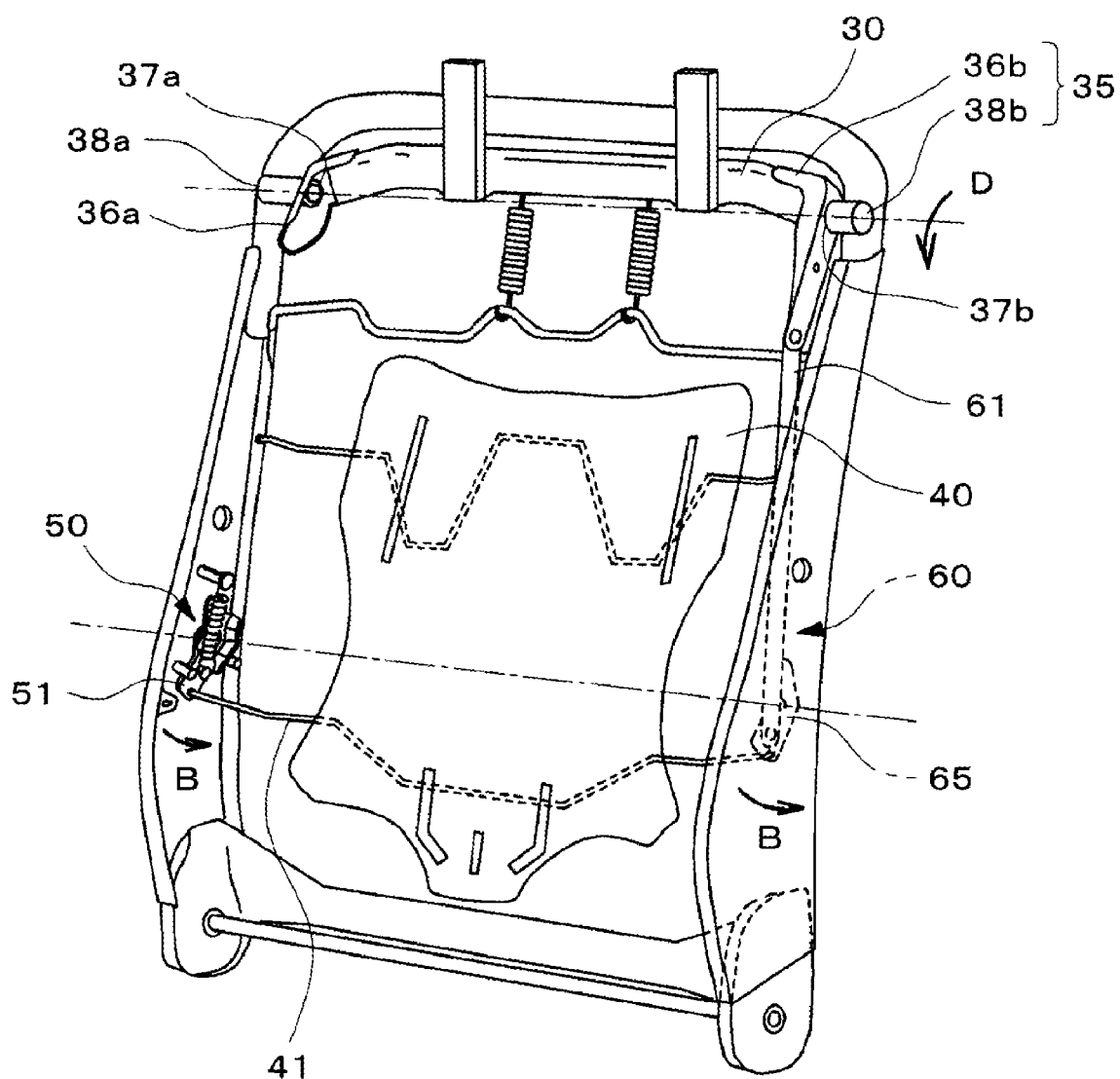
FIG. 6 is an operation explanatory perspective view of a vehicle seat in accordance with a first embodiment.

As shown in FIG. 6, when a load is applied to the plate-like support body 40 and the plate-like support body 40 is pushed and moved to the rear, the wire spring 41 pulls the link member 51 and the lower link 65 to the rear simultaneously, and the link member 51 and the lower link 65 at the right and left rotate in parallel around the rotating shaft on the substantially identical straight line to the direction indicated by the arrow mark B in FIG. 6. The rotating operation of the lower link 65 is transmitted via the connecting link 61 and the upper link 35, and finally rotates the link brackets 36a and 36b to the direction indicated by the arrow mark D with the rotation supporting members 38a and 38b (the shafts 37a and 37b) being the rotating shafts, whereby the headrest mounting rod 30 is moved to the front.

Since the engagement section 50 is provided with the second stopper 59 (refer to FIG. 4) for regulating the rearward rotating of the link member 51, when a load is applied to the plate-like support body 40, the link member 51 is pulled by the wire spring 41 and is rotated a fixed amount, and thereafter is stopped by the second stopper 59. On the other hand, the lower link 65 of the transmission section 60 continues rotating, and further moves to the rear. Therefore, the side on which the plate-like support body 40 is connected to the transmission section 60 (the left-hand side in FIG. 6) moves further to the rear as compared with the side on which the plate-like support body 40 is connected to the engagement section 50 (the right-hand side in FIG. 6), so that the plate-like support body 40 becomes in a slantwise tilted state.

FIG. 7 shows the state of the plate-like support body 40 and the load applied to the passenger at the time of rear-end collision. FIG. 7A is an explanatory sectional view of the surroundings of the passenger's trunk at the time of rear-end collision for the conventional vehicle seat in which the transmission section 60 is provided on the side frames on both sides, and FIG. 7B is an explanatory perspective view of the passenger's head in the state shown in FIG. 7A. FIG. 7C is an explanatory sectional view of the surroundings of the passenger's trunk at the time of rear-end collision for the vehicle seat S of this embodiment in which the transmission section 60 is provided on one side frame only, and FIG. 7D is an explanatory perspective view of the passenger's head in the state shown in FIG. 7C.

Figure 7A:
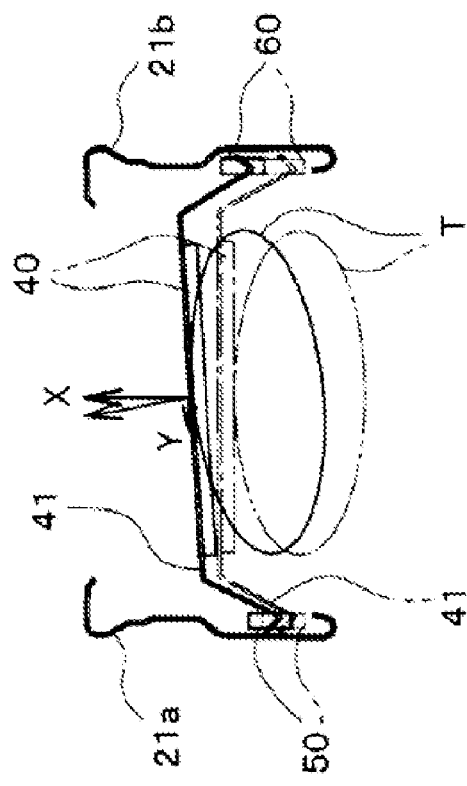
FIGS. 7A-7D are explanatory pictorial views of a load applied to a passenger when a rear-end collision occurs.
Figure 7B:
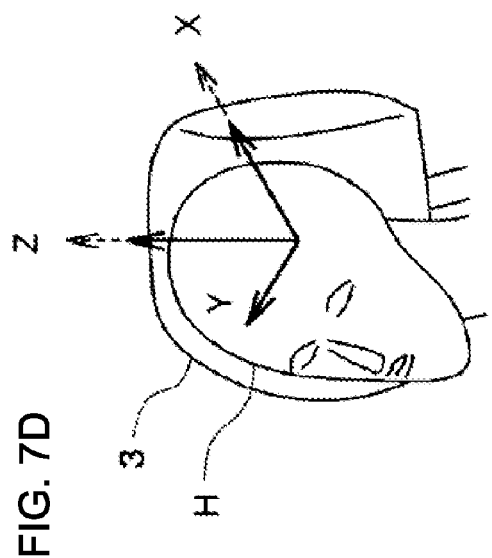

The front and rear direction of the vehicle seat is taken as the X axis, the right and left direction thereof as the Y axis, and the up and down direction thereof as the Z axis. As shown in FIG. 7A, for the conventional vehicle seat, when the passenger's trunk T (the back and waist) presses the plate-like support body 40 when a rear-end collision occurs, the plate-like support body 40 moves to the rear substantially in parallel in the front and rear direction of vehicle (the solid line in FIG. 7A). Therefore, the load at which the passenger's trunk T presses the plate-like support body 40, that is, the impact force received by the passenger's trunk T is a load toward the X-axis direction and the Z-axis direction (the Z-axis direction is not shown). Also, this load (impact force) is transmitted to the passenger's head H in the same manner, and as shown in FIG. 7B, the load (impact force) toward the X-axis direction and the Z-axis direction is applied to the head H. Thus, for the conventional vehicle seat, a load is applied to the passenger's head H in two directions of the X-axis direction and the Z-axis direction.

Figure 7C:
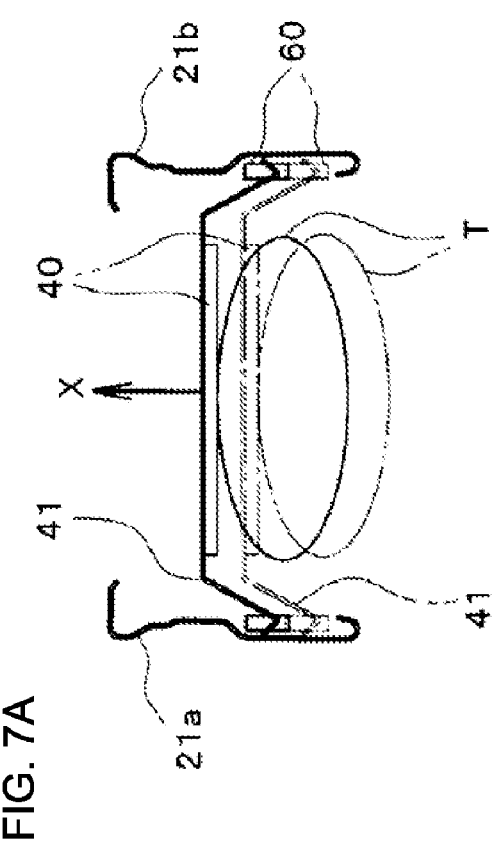
Figure 7D:
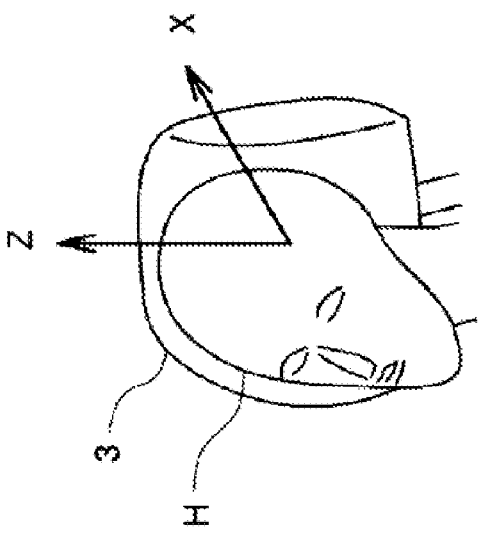

On the other hand, for the vehicle seat S of this embodiment, when the passenger's trunk T (the back and waist) presses the plate-like support body 40 when a rear-end collision occurs, as described above, the side on which the plate-like support body 40 is connected to the transmission section 60 moves further to the rear as compared with the side on which the plate-like support body 40 is connected to the engagement section 50, so that the plate-like support body 40 becomes in a slantwise tilted state (the solid line in FIG. 7C). Therefore, the load at which the passenger's trunk T presses the plate-like support body 40, that is, the load in the horizontal direction and the vertical direction of the impact force received by the passenger's trunk T is distributed to loads in the X-axis direction and the Y-axis direction, and the Z-axis direction and the Y-axis direction. As shown in FIG. 7D, the load (impact force) applied to the passenger's head H is similarly distributed to three directions of the X-axis direction, the Y-axis direction, and the Z-axis direction. Thus, by the slantwise tilting of the passenger's posture, the impact force at the time of rear-end collision is distributed to the Y-axis direction. Therefore, the impact force in the front and rear direction (the X-axis direction) and the up and down direction (Z-axis direction) can be reduced as compared with the conventional vehicle seat in which the load is applied in two directions.

By adjusting the urging force (spring load) of the extension spring 55 serving as the urging member provided in the engagement section 50, the movement start load of the link member 51 can be adjusted, and also the tilt angle of the plate-like support body 40 can be adjusted. Therefore, the impact force at the time of rear-end collision can be distributed by tilting the plate-like support body 40 to the right or the left through a desired angle.

Next, another embodiment (a second embodiment) of the vehicle seat in accordance with the present invention is described.

Figure 8:
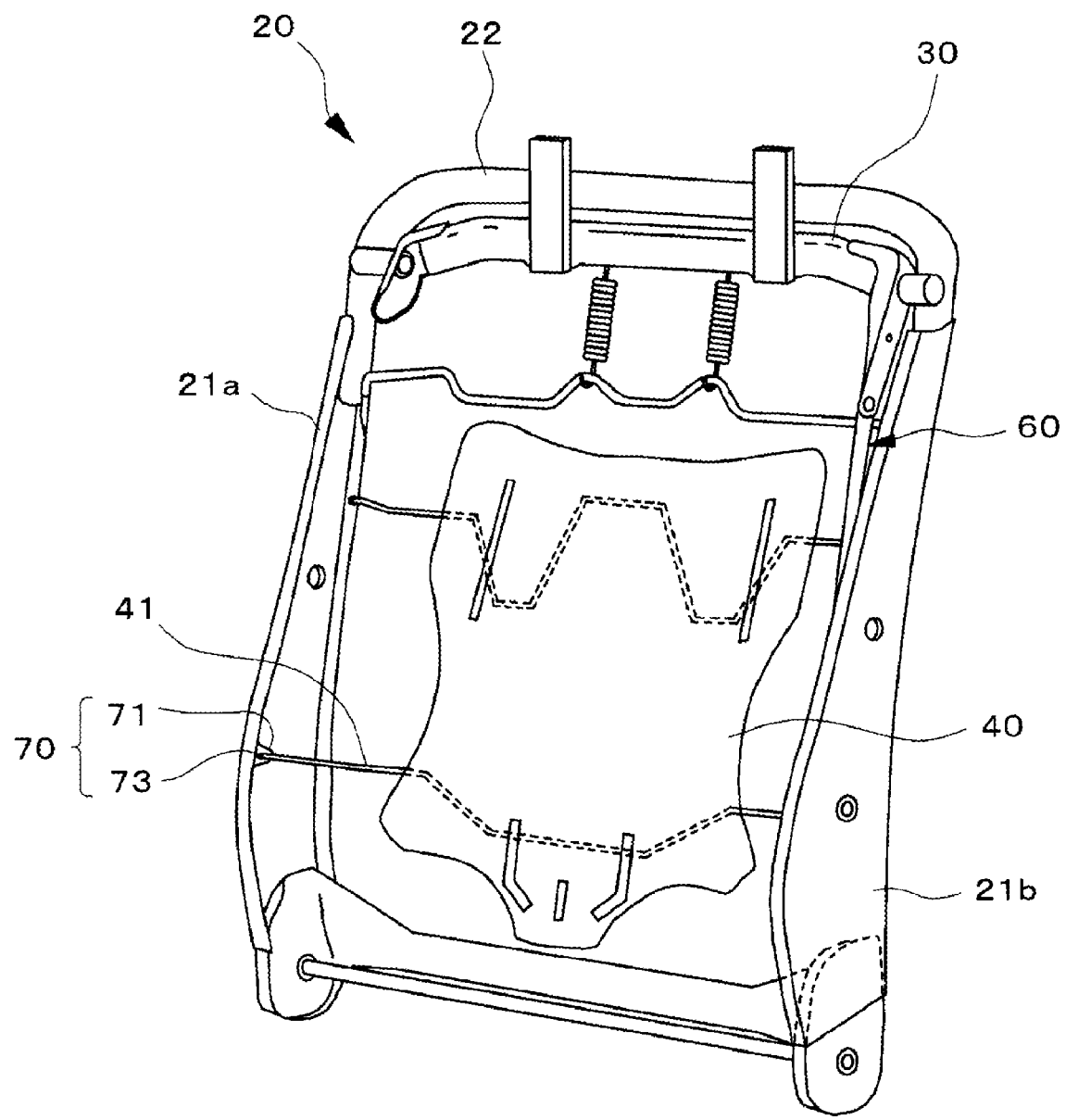
FIG. 8 is a schematic perspective view of a seat back frame for a vehicle seat in accordance with a second embodiment.

FIG. 8 is a schematic perspective view of the seat back frame 20 for a vehicle seat in accordance with the second embodiment.

In this embodiment, the same symbols are applied to members and arrangements that are the same as those in the above-described embodiment, and the explanation thereof is omitted.

For the vehicle seat of this embodiment, the side frame 21a on the right-hand side as viewed from the passenger (the left-hand side in FIG. 8) of the seat back frame 20 is provided with an engagement section 70 for connecting the plate-like support body 40 to the side frame 21a via the wire spring 41. On the side frame 21a, a protrusion-shaped wire locking part 71a part of which is projected to the inside is formed slightly below the center in the up and down direction of a portion in which the front end side of the side frame 21a is bent to the inside. Also, in the wire locking part 71, a wire locking hole 73 is formed. The engagement section 70 of this embodiment is formed by the wire locking part 71 and the wire locking hole 73. One end of the wire spring 41 is inserted through and locked to the wire locking hole 73, whereby the plate-like support body 40 is connected to the side frame 21a via the wire spring 41.

In this embodiment, the engagement section 70 is provided in place of the engagement section 50 in the above-described first embodiment. Except the configuration of the engagement section 70, the vehicle seat of this embodiment has the same configuration as that of the vehicle seat S of the first embodiment. Therefore, at the time of a rear-end collision of the vehicle, when the plate-like support body 40 serving as the pressure receiving part receives a rearward load, the link mechanism of the transmission section 60 provided on the inside of the side frame 21b is operated, whereby the headrest mounting rod 30 is rotated and moved to the front.

The wire spring 41 of this embodiment is directly mounted to the side frame 21a via the engagement section 70 formed integrally with the side frame 21a, so that even if the load received by the plate-like support body 40 is transmitted, the engagement section 70 does not rotate unlike the engagement section 50 of the first embodiment. Therefore, the side on which the plate-like support body 40 is connected to the engagement section 70 scarcely moves to the rear. On the other hand, the side on which the plate-like support body 40 is connected to the transmission section 60 is subjected to a higher load, and the rearward displacement increases. Thus, as compared with the vehicle seat S provided with the engagement section 50 of the first embodiment, the plate-like support body 40 tilts further slantwise in the right and left direction, and the passenger's posture tilts further slantwise. As a result, the impact force at the time of rear-end collision is distributed further to the Y-axis direction, so that the impact force in the front and rear direction (the X-axis direction) and the up and down direction (the Z-axis direction) applied to the passenger's trunk and head can further be reduced.

Furthermore, in this embodiment, the number of parts can be decreased while the function of supporting the passenger's head to buffer the shock when a rear-end collision occurs is provided. Therefore, the manufacturing cost can be reduced, and the assembling work can be made simple. Also, the weight of seat can be reduced.

For the engagement section 70 of this embodiment, the protrusion-shaped wire locking part 71 is formed by projecting a part of a portion, in which the front end side of the side frame 21a is bent to the inside, to the inside. However, the configuration is not limited to such a protrusion shape, and the engagement section 70 may be configured by directly forming the wire locking hole 73 in the portion in which the side frame 21a is bent to the inside. Also, the shape of the locking part is not limited to a hole, and any shape that locks the end part of the wire spring 41, such as a hook shape, may be adopted.

Next, still another embodiment (a third embodiment) of the vehicle seat in accordance with the present invention is described.

Figure 9:
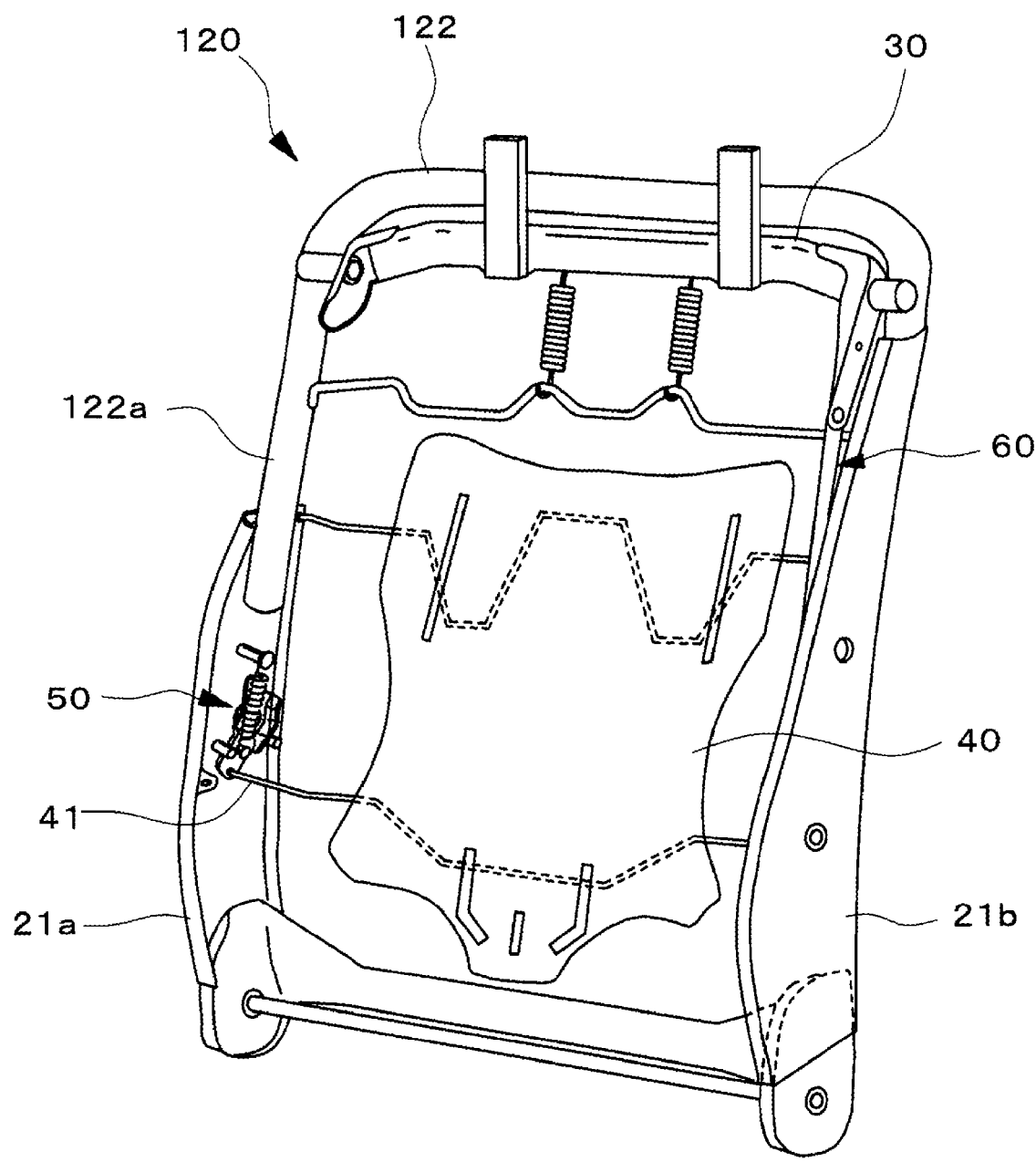
FIG. 9 is a schematic perspective view of a seat back frame for a vehicle seat in accordance with a third embodiment.

FIG. 9 is a schematic perspective view of a seat back frame 120 for a vehicle seat in accordance with the third embodiment. In this embodiment, a side frame 121a on the right-hand side as viewed from the passenger (the left-hand side in FIG. 9) is formed to be shorter in the longitudinal direction than the opposed side frame 21b. As shown in FIG. 9, the side frame 121a has a height about a half of the height of the seat back frame 120.

For an upper frame 122 provided on the upper side of the seat back frame 120 of this embodiment, the central portion of which is a frame member extending in the right and left direction, both the ends thereof at the right and the left are bent downward and extend. The side frame 121a side of the bent right and left end parts has an extending part 122a extending downward longer than the side frame 21b side, and the extending part 122a is fixed to the side frame 121a formed to be short by welding or the like. By shortening the shape of the side frame 121a on the side on which the engagement section 50 is provided, the use of raw material such as a steel material for manufacturing the seat back frame 120 can be reduced, and also the weight of seat can be reduced.

In this embodiment, the side frame 121a and the upper frame 122 are provided in place of the side frame 21a and the upper frame 22 of the above-described first embodiment. Except these configurations, the vehicle seat of this embodiment has the same configuration as that of the vehicle seat S of the first embodiment. Therefore, in a rear-end collision, an effect of reducing the weight of seat can be achieved while the function of supporting the passenger's head to buffer the shock when a rear-end collision occurs is provided. In this embodiment, the engagement section 50 of the first embodiment is provided as the engagement section. In place of the engagement section 50, the engagement section 70 of the second embodiment may be provided. In this case as well, the same effect can be achieved.

In the above-described first to third embodiments, the engagement section 50 or 70 is provided on the inside of the side frame 21a or 121a on the right-hand side as viewed from the passenger, and the transmission section 60 is provided on the side frame 21b on the left-hand side as viewed from the passenger. However, the configuration is not limited to this one, and the engagement section 50 or 70 and the transmission section 60 may be provided on the opposite side. That is, the transmission section 60 can be provided on the side frame 21a on the right-hand side as viewed from the passenger, and the engagement section 50 or 70 can be provided on the side frame 21b on the left-hand side as viewed from the passenger. In this case, the longitudinally short side frame used in the third embodiment is provided on the left-hand side, whereby the configuration that is the same as that of the third embodiment can be adopted. Even if the engagement section and the transmission section are provided on the opposite side in this manner, the effect that is the same as the effects of the above-described first to third embodiments is achieved.

Figure 10:
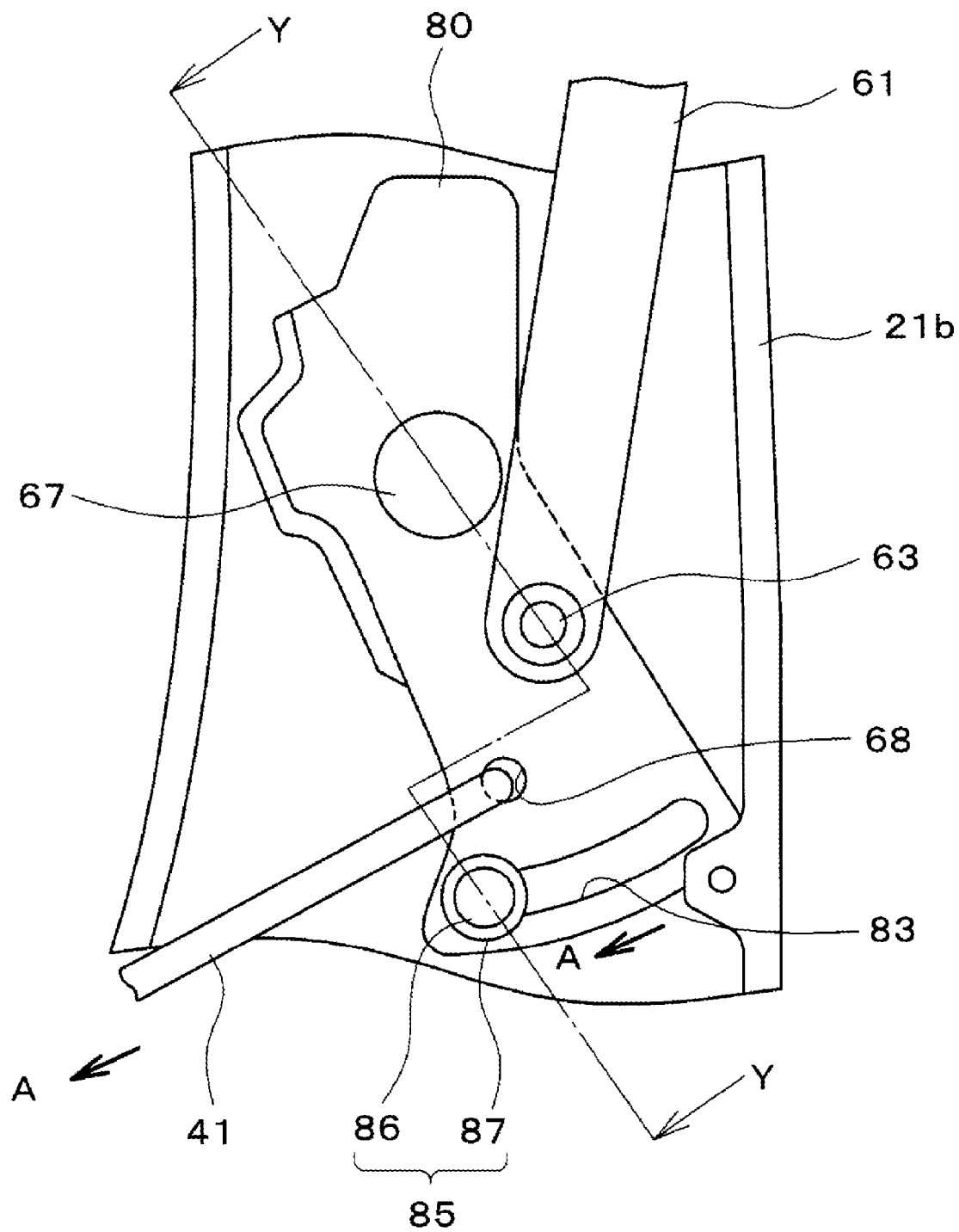
FIG. 10 is an explanatory side view of a lower link in accordance with another embodiment.
Figure 11:
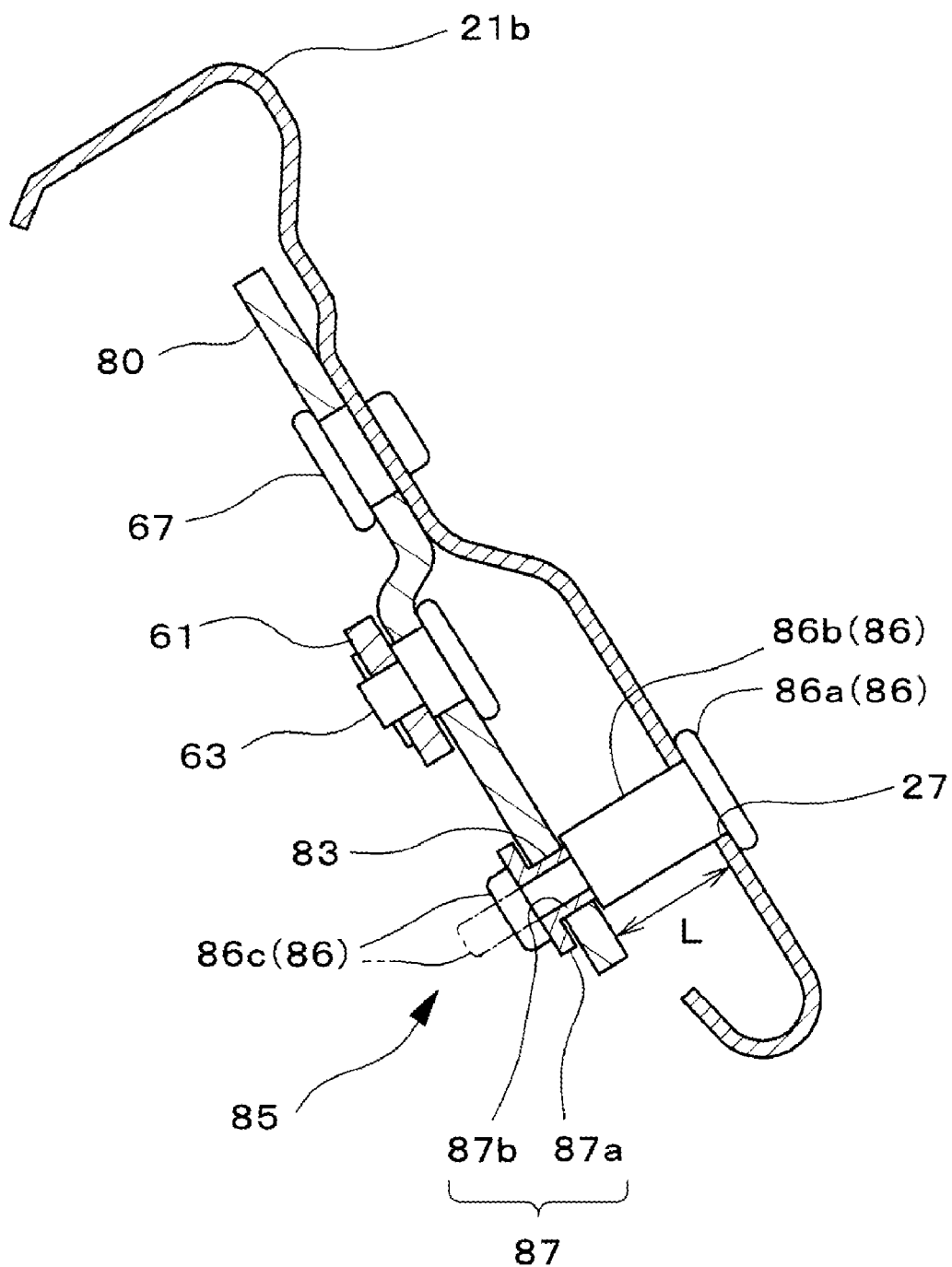
FIG. 11 is a sectional view taken along the line Y-Y of FIG. 10, showing a lower link in accordance with another embodiment.
Figure 12:
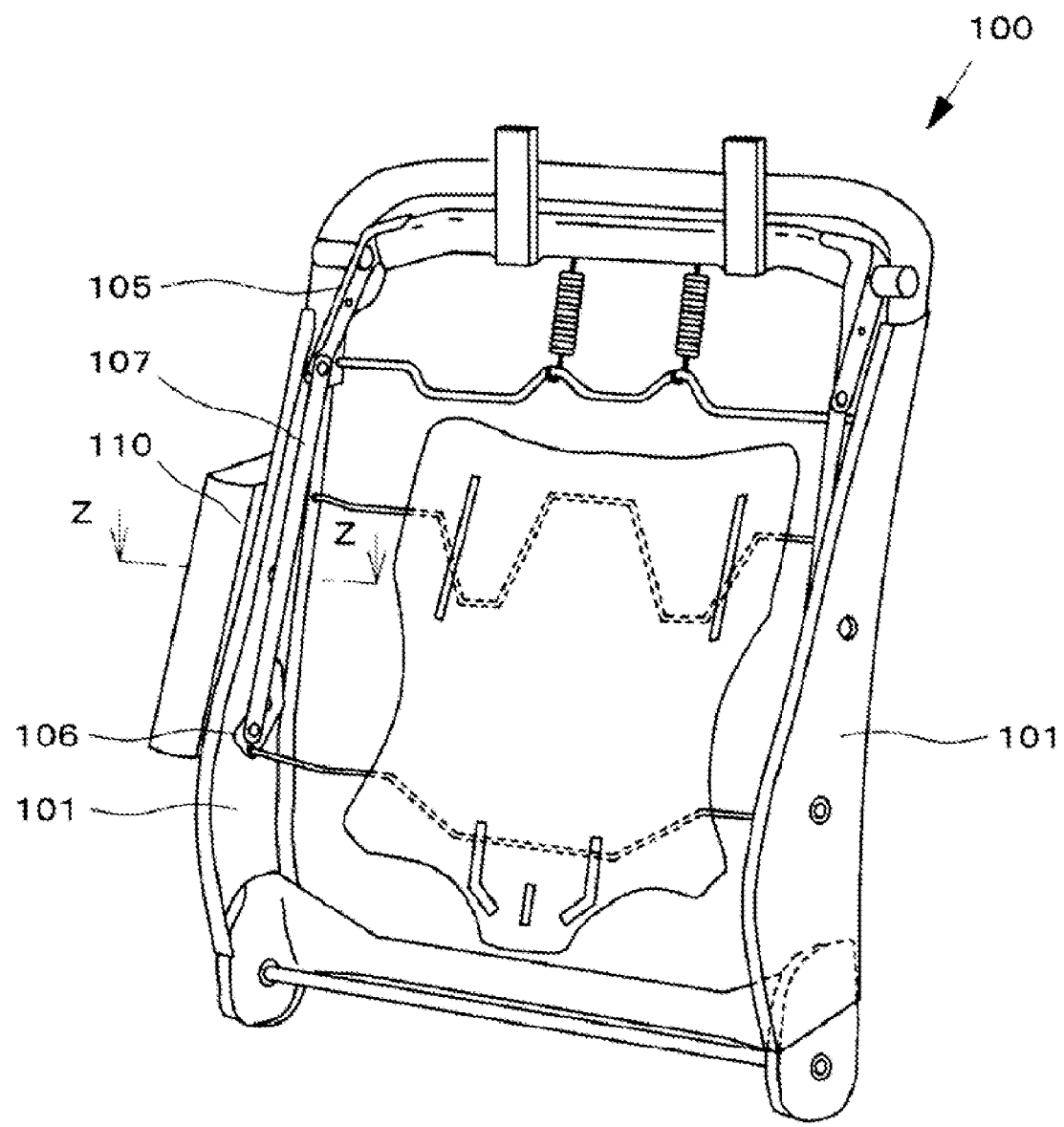
FIG. 12 is an explanatory perspective view of a seat back frame for a conventional vehicle seat.
Figure 13:
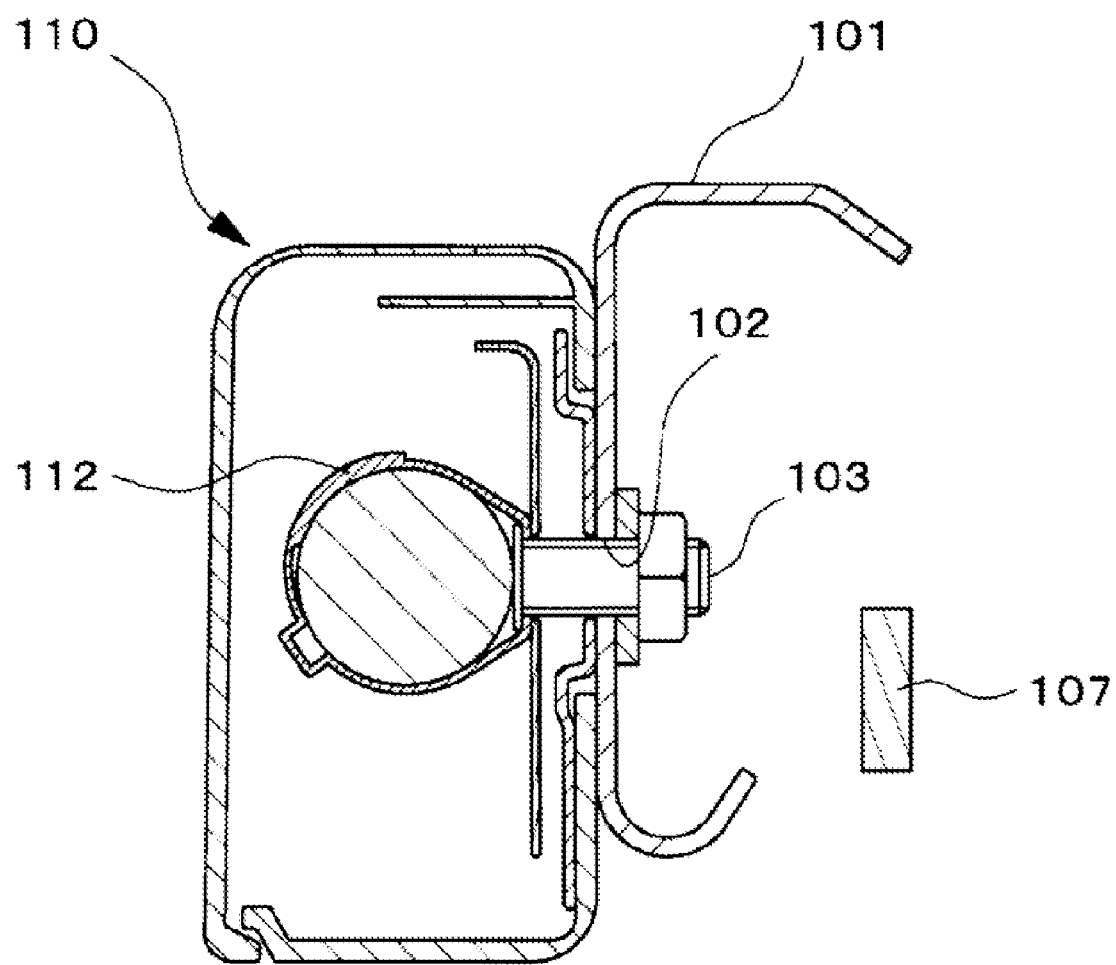
FIG. 13 is a sectional view taken along the line Z-Z of FIG. 12.

Next, another embodiment of the lower link of the transmission section 60 is described with reference to FIGS. 10 and 11. FIG. 10 is an explanatory view of the lower link in accordance with another embodiment, and FIG. 11 is a sectional view taken along the line Y-Y of FIG. 10.

A lower link 80 of this embodiment is formed with an elongated hole 83, which extends to the right and left direction as a guide hole, below the wire locking hole 68 to which the wire spring 41 is locked. Specifically, this elongated hole 83 is formed into an arcuate shape along the rotating direction at the time when the lower link 80 rotates around the shaft 67. Between the elongated hole 83 and a pin mounting hole 27 formed in the side frame 21b, a holding member 85 is inserted through and locked, and the side frame 21b and the lower link 80 are connected to each other.

The holding member 85 of this embodiment, which is a member that is formed by a pin 86 and a spacer 87, connects the side frame 21b and the lower link 80 to each other, and keeps the distance between the side frame 21b and the lower link 80 at a predetermined value. The pin 86 is formed by a pin head 86a, a shank part 86b, and a pin point 86c. In this embodiment, as the pin 86, a stepped flat head rivet having two different diameters of the shank part 86b is used.

The spacer 87 of this embodiment is a member having a T shape in side view, including a collar part 87a and a hollow shell part 87b, and the shell part 87b is formed into a shape slightly longer than the thickness of the lower link 80, so that when the spacer 87 is interposed between the lower link 80 and the pin 86, a clearance is secured so that the pin 86 can move in the elongated hole 83 of the lower link 80. The spacer 87 is preferably formed of a material having a low friction coefficient, such as a fluorocarbon resin, so that the pin 86 can move smoothly in the elongated hole 83.

The pin 86 and the spacer 87 of the holding member 85 are mounted as described below to connect the lower link 80 to the side frame 21b. First, the pin 86 is inserted through the pin mounting hole 27 from the outside (the right-hand side in FIG. 11) of the side frame 21b, and the pin head 86a is fixed to the side frame 21b by welding or the like. At this time, the pin point 86c (the broken line in FIG. 11) is inserted through the elongated hole 83 in the lower link 80. Successively, the T-shaped spacer 87 is put onto the pin point 86c from the outside (the left-hand side in FIG. 11) of the lower link 80, and the shell part 87b of the spacer 87 is fitted between the shank part 86b of the pin 86 and the elongated hole 83. Thereafter, the pin point 86c is formed by caulking (the solid line in FIG. 11) to mount the pin 86.

Since the pin 86 is movably mounted to the lower link 80, when a load is applied to the plate-like support body 40, and the lower link 80 is pulled by the wire spring 41, the arcuate elongated hole 83 moves along the pin 86 with the pin 86 fixed to the side frame 21b being a guide. Therefore, the lower link 80 rotates to the direction indicated by the arrow mark A in FIG. 10 around the shaft 67.

In the state in which the holding member 85 is mounted, as shown in FIG. 11, since the shank part 86b of the pin 86 is interposed between the side frame 21b and the lower link 80, the side frame 21b and the lower link 80 are always separated by a predetermined distance L, and the predetermined distance is kept. Also, the pin head 86a of the pin 86 is fixed to the outside (the right-hand side in FIG. 11) of the side frame 21b, and the collar part 87a of the spacer 87, having a diameter larger than the inside diameter of the elongated hole 83, and the caulked pin point 86c are mounted on the outside (the left-hand side in FIG. 11) of the lower link 80. Therefore, the outside of the side frame 21b and the outside of the lower link 80 are always held by the pin head 86a and the pin point 86c via the collar part 87a of the spacer 87.

The transmission section 60 of this embodiment is rotatably mounted to the upper frame 22 and the side frame 21b of the seat back frame 20 with the shaft 37b and the shaft 67. The transmission section 60 is a long shape, and the shaft 37b and the shaft 67 have some distance therebetween. Therefore, when a shock is produced by a rear-end collision or the like and the transmission section 60 moves, a load is sometimes applied to the direction tilting from the parallel direction with the side frame 21b (the front and rear direction of vehicle) to either the right or the left, that is, to the direction tilting to either the inside or the outside of the seat back frame 20. Also, when the shock (load) applied to the plate-like support body 40 is transmitted to the lower link 80 via the wire spring 41, a load is suddenly applied to the frame inside direction, and the load is sometimes applied to the direction tilting to the inside with respect to the transmission section 60.

The lower link 80 and the side frame 21b of this embodiment are connected to each other by two shafts of the shaft 67 and the holding member 85, and further, by the above-described configuration of the holding member 85, the side frame 21b and the lower part of the lower link 80 are connected so that the predetermined distance is kept. Therefore, even if a slantwise load is applied to the lower link 80, the rotating of the transmission section 60 is kept in the direction substantially parallel with the side frame 21b.

Thus, since the rotating of the lower link 80 is regulated by the holding member 85 so that the lower link 80 rotates substantially in parallel with the side frame 21b within the range of the elongated hole 83, the transverse falling-down of the transmission section 60 can be prevented. When the link mechanism operates substantially in parallel with the seat back frame 20, the loss of load transmitted to the headrest 3 via the link mechanism can be suppressed, so that the load can be transmitted to the headrest 3 efficiently.

In the above-described embodiment, the holding member 85 and the elongated hole 83 through which the holding member 85 is inserted are disposed below the shaft 67 of the lower link 80 to be separated by the predetermined distance. However, the configuration may be such that an elongated hole is formed above the shaft 67 of the lower link 80 to be separated by the predetermined distance, and the holding member 85 is mounted by being inserted through the elongated hole. Even in the case where the holding member 85 is provided above the shaft 67 of the lower link 80 in this manner, the distance between the side frame 21b and the lower link 80 at the time of rotating of the lower link 80 can be kept, so that the slantwise tilting of the transmission section 60 can be prevented.

Also, the holding member 85 of this embodiment is mounted by caulking the rivet. However, a bolt and nut or the like may be used in place of the rivet.

The lower link 80 and the pin 86 of this embodiment may be provided in any vehicle seat of the above-described first to third embodiments. In this case, the same effect of preventing the transverse falling-down can be achieved.

As described above, according to the vehicle seat in accordance with the various embodiments of the present invention, the degree of freedom of layout of ancillary parts of the seat back can be increased, and also the ancillary parts can be mounted and demounted easily without impairing the function of moving the headrest to the front in a rear-end collision to hold and protect the passenger's head. Also, the number of parts of seat can be decreased, and the weight thereof can be reduced. Further, the impact force received by the passenger's head in a rear-end collision can be reduced.

| TABLE OF REFERENCE CHARACTERS | |
|---|---|
| S | vehicle seat |
| 1 | seat cushion |
| 2 | seat back |
| 3 | headrest |
| 4 | cushion material |
| 5 | cover material |
| 7 | head supporting part |
| 8 | pillar |
| 10 | seat cushion frame |
| 11 | base frame |
| 20 | seat back frame |
| 21a, 21b | side frame |
| 22 | upper frame |
| 23 | lower frame |
| 25 | mounting hole |
| 27 | pin mounting hole |
| 30 | headrest mounting rod |
| 31 | pillar supporting member |
| 35 | upper link |
| 36a, 36b | link bracket (upper link) |
| 37a, 37b, 39 | shaft |
| 38a, 38b | rotation supporting member (upper link) |
| 40 | plate-like support body (pressure receiving part) |
| 41 | wire spring (connecting member) |
| 42 | wire spring |
| 47 | return spring |
| 48 | spring support wire |
| 50 | engagement section |
| 51 | link member (movable member) |

-continued

TABLE OF REFERENCE CHARACTERS

| | |
|---|---|
| 52 | shaft |
| 53 | wire locking hole |
| 55 | extension spring (urging member) |
| 56 | first spring locking pin |
| 57 | second spring locking pin |
| 58 | first stopper |
| 59 | second stopper |
| 60 | transmission section |
| 61 | connecting link |
| 63, 67 | shaft |
| 65 | lower link |
| 68 | wire locking hole |
| 70 | engagement section |
| 71 | wire locking part |
| 73 | wire locking hole |
| 80 | lower link |
| 83 | elongated hole |
| 85 | holding member |
| 86 | pin |
| 86a | pin head |
| 86b | shank part |
| 86c | pin point |
| 87 | spacer |
| 87a | collar part |
| 87b | shell part |
| 100 | seat back frame |
| 101 | side frame |
| 102 | mounting hole |
| 103 | fastener |
| 105 | upper link |
| 106 | lower link |
| 107 | transmission member |
| 110 | airbag module |
| 112 | inflator |
| 120 | seat back frame |
| 121a | side frame |
| 122 | upper frame |
| 122a | extending part |
| T | passenger |
| H | passenger's head |

The invention claimed is:

1. A vehicle seat having a mechanism for moving a headrest in a rear-end collision, comprising:
    a seat back frame having a pair of side frames disposed in a spaced manner in a right and left direction;
    a pressure receiving part disposed between the pair of side frames to receive a load placed by a rearward movement of a passenger;
    a transmission section disposed on one side frame side of the pair of side frames to connect the pressure receiving part to the headrest and transmit the load received by the pressure receiving part to a side of the headrest; and
    an engagement section disposed on the other side frame side of the pair of side frames that engages the pressure receiving part with the other side frame, and is not connected to the headrest,
    wherein
    when a load exceeding a predetermined magnitude is received by the pressure receiving part, the load is transmitted to the headrest side via the transmission section, thereby moving the headrest.

2. The vehicle seat according to claim 1, wherein the other side frame provided with the engagement section is formed to be shorter in a vertical direction than the one side frame provided with the transmission section.

3. The vehicle seat according to claim 1, wherein the engagement section comprises:
    a movable member mounted to the other side frame and connected to the pressure receiving part; and
    an urging member for urging the movable member to a direction opposite to a direction of movement of the pressure receiving part caused by the load of the rearward movement of the passenger.

4. The vehicle seat according to claim 1, wherein:
    the pressure receiving part is engaged with the other side frame via a connecting member;
    the engagement section is formed integrally with the other side frame; and
    the connecting member is locked to the engagement section.

5. The vehicle seat according to claim 1, wherein the transmission section comprises:
    a lower link rotatably mounted in a lower part of the one side frame and connected to the pressure receiving part;
    an upper link connectable to the headrest; and
    a connecting link connecting the lower link and the upper link to each other and operating in association with the rotating of the lower link.

6. The vehicle seat according to claim 5, wherein:
    the lower link comprises a holding member disposed at a position separated from a rotating shaft by a predetermined distance; and
    the holding member connects the lower link to the one side frame, and keeps the distance between the one side frame and the lower link at a predetermined value.

* * * * *